US007133476B2

(12) United States Patent
Arslan et al.

(10) Patent No.: US 7,133,476 B2
(45) Date of Patent: Nov. 7, 2006

(54) APPARATUS AND METHODS FOR SUPPRESSION OF INTERFERENCE AMONG DISPARATELY-MODULATED SIGNALS

(75) Inventors: Huseyin Arslan, Morrisville, NC (US); Rajaram Ramesh, Cary, NC (US)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 861 days.

(21) Appl. No.: 10/210,606

(22) Filed: Aug. 1, 2002

(65) Prior Publication Data

US 2004/0022335 A1   Feb. 5, 2004

(51) Int. Cl.
*H03D 1/04*   (2006.01)
*H03D 1/06*   (2006.01)
*H04L 25/08*   (2006.01)

(52) U.S. Cl. .................. 375/346; 329/318; 329/320; 348/21; 348/607; 455/63; 455/296

(58) Field of Classification Search ............... 375/346; 455/63.1, 296
See application file for complete search history.

(56) References Cited

U.S. PATENT DOCUMENTS 5,430,770 A   7/1995   Abbey ..................... 375/349

| 6,314,147 | B1 | 11/2001 | Liang et al. | 375/346 |
|---|---|---|---|---|
| 6,862,326 | B1 * | 3/2005 | Eran et al. | 375/343 |
| 6,944,434 | B1 * | 9/2005 | Mattellini et al. | 455/296 |
| 2004/0014424 | A1 * | 1/2004 | Kristensson et al. | 455/63.1 |
| 2004/0028155 | A1 * | 2/2004 | Dornstetter et al. | 375/343 |

FOREIGN PATENT DOCUMENTS

WO   WO0193439   * 12/2001
WO   WO0211378   *  2/2002

* cited by examiner

*Primary Examiner*—Temesghen Ghebretinsae
*Assistant Examiner*—Juan Alberto Torres (57) ABSTRACT

Information is recovered from a composite signal including first and second component signals modulated according to respective first and second modulations, for example, 8-PSK and GMSK. The composite signal is processed based on predetermined characteristics of the first and second modulations, for example, signal rotations, to generate a channel model for the first component signal and a whitening filter for the second component signal. The composite signal is filtered according to the whitening filter to generate a filtered signal. A symbol hypothesis for a symbol of the first component signal is evaluated using a metric with respect to the filtered signal that is a function of the whitening filter and the channel model, for example, in a multidimensional Viterbi symbol estimation algorithm. The invention may be embodied as methods, apparatus and computer program products.

53 Claims, 8 Drawing Sheets

APPARATUS AND METHODS FOR SUPPRESSION OF INTERFERENCE AMONG DISPARATELY-MODULATED SIGNALS

BACKGROUND OF THE INVENTION

The present invention relates to wireless communications system, and more particularly, to receiver apparatus, methods and computer program products.

Wireless communications are now widely used for a variety of applications, including voice telephony and data communications applications, such as wireless e-mail and internet applications. As the number of wireless applications has increased, the data rate requirements associated with these applications has generally increased. Accordingly, new higher data rate wireless communications standards, and modifications to existing standards that can provide increased data rates, have been proposed.

For example, Enhanced Data rates for Global Evolution (EDGE) has been introduced to increase potential data rates in systems conforming to the Global System for Mobile Communications/General Packet Radio Service (GSM/GPRS) standards. Although GPRS and EDGE share the same symbol rate, the modulation bit rate differs. In particular, GSM has traditionally employed Gaussian Minimum Shift Keying (GMSK), which may be considered a type of phase modulation. Every symbol that is transmitted represents one bit, i.e., each shift in the phase represents one bit. EDGE is specified to reuse the channel structure, channel width, channel coding and the existing mechanisms and functionality of GPRS. However, EDGE uses 8-phase shift keying (8-PSK), which has the similar qualities in terms of generating interference on adjacent channels as GMSK, but can provide a higher data rate. 8-PSK modulation is a linear modulation in which three consecutive bits are mapped onto one symbol in the I/Q plane. The symbol rate, or the number of symbols sent within a certain period of time, remains the same as for GMSK, but each symbol represents three bits instead of one, which can increase the total data rate by a factor of three.

Co-channel interference, i.e., interference arising from frequency reuse in a geographical area, may limit user capacity and signal quality in a cellular system. A technique for dealing with co-channel interference between GMSK signals is described in U.S. patent application Ser. No. 09/549,559, entitled "Method and Apparatus for Interference Rejection," to Khayrallah et al., filed Apr. 14, 2000, and in U.S. patent application Ser. No. 09/956,443, entitled "Methods and Apparatus for Canceling Co-channel Interference in a Receiving System Using Spatio-Temporal Whitening," to Arslan et al., filed Sep. 19, 2001. Other techniques are described in Published PCT International Application No. WO98/16021.

These techniques may not be useful when 8-PSK modulation is used for the desired signal. Interference suppression for 8-PSK modulated desired signals has been proposed for receivers having multiple antennas, but it may be undesirably costly to use multiple antennas in a mobile terminal.

SUMMARY OF THE INVENTION

According to some embodiments of the invention, information is recovered from a composite signal including first and second component signals modulated according to respective first and second modulations. The composite signal is processed based on predetermined characteristics of the first and second modulations, for example, signal rotations of the modulations and/or other known signal information, to generate a channel model for the first component signal and a whitening filter for the second component signal. The composite signal is filtered according to the whitening filter to generate a filtered signal. A symbol hypothesis for a symbol of the first component signal is evaluated using a metric with respect to the filtered signal that is a function of the whitening filter and the channel model, for example, in a multidimensional Viterbi symbol estimation algorithm. The invention may be embodied as methods, apparatus and computer program products.

DETAILED DESCRIPTION

The present invention will now be described more fully with reference to the accompanying drawings, in which exemplary embodiments of the invention are shown. These embodiments are provided so that this application will be thorough and complete. Like numbers refer to like elements throughout.

According to some embodiments of the present invention, information is recovered from a composite signal including first and second component signals modulated according to respective first and second modulations by processing the composite signal based on predetermined characteristics of the first and second modulations to generate a channel model for the first component signal and a whitening filter for the second component signal. The composite signal may be processed according to the whitening filter to generate a filtered signal. A symbol hypothesis for a symbol of the first component signal may be evaluated using a metric with respect to the filtered signal that is a function of the whitening filter and the channel model. The channel model and/or whitening filter may be generated in several different ways, as described below. As also described below, precalculation techniques may be used to streamline generation of symbol estimates. In addition, the interference suppression techniques may be adaptively applied based on detection of the type of modulation present in the composite signal.

According to further embodiments of the present invention, a desired signal may be recovered from a composite signal by generating a channel model for the desired signal and a whitening filter for an interfering signal having a modulation different than that of the desired signal. The composite signal may be filtered according to the whitening filter to generate a filtered signal. The desired signal may be estimated using a multi-dimensional estimation process, e.g., a multidimensional Viterbi or other equalization process, that employs a metric with respect to the filtered signal that is a function of the whitening filter and the channel model. For example, the desired signal may be an 8-PSK modulated signal and the interfering signal may comprise a GMSK modulated signal, as might be found in an EDGE environment.

Exemplary techniques for interference suppression for an 8-PSK desired signal in the presence of a GMSK interferer, as might be applicable in an EDGE application, are described below. These exemplary techniques involve I-Q whitening of the interferer using a two-dimensional autoregressive (AR) whitening filter and applying a two-dimensional (2-D) equalizer to the filtered 8-PSK signal. Prefiltering of the 8-PSK signal is generally desirable if it is desired to used reduced complexity equalization techniques, such as decision feedback state estimation (DFSE). If may be advantageous for such prefiltering to be done before the whitening, because there are well-known techniques for one-dimensional (1-D) prefiltering.

The techniques described herein may lend themselves to multiple implementations. For example, a low complexity implementation of a 2-D equalizer that allows a significant amount of precalculation of the hypothesized signals can be used to provide simplified metric calculation. According to some embodiments, adaptive choice of a demodulator may be made responsive to detecting the nature of the desired signal and/or interferer. In particular, it may be desirable to know that a GMSK interferer is present before deciding whether to use the demodulation techniques described herein, as other demodulator structures may be more effective for other types of interference.

An interference suppression technique for an 8-PSK desired signal in the presence of GMSK interference may be viewed as comprising: (1) manipulating the received signal to facilitate reflection of the GMSK interference; and (2) equalizing the resulting signal to retrieve the information of the desired 8-PSK signal.

A received signal may be viewed as a combination of an 8-PSK desired signal and a GMSK interferer, approximated by:

$$r(n) = \left\{\sum_{k=0}^{L-1} h(k)s(n-k)\right\} e^{j\frac{3\pi n}{8}} + \left\{\sum_{k=0}^{L-1} g(k)i(n-k)\right\} e^{j\frac{\pi n}{2}} + w(n), \quad (1)$$

where h(k) is the channel encountered by the desired signal $$s(n) \in u\left\{e^{j\frac{k2\pi}{8}}; k = 1, \ldots, 8\right\},$$

g(k) is the channel encountered by the interferer signal $i(n) \in \{+1, -1\}$, and w(n) is noise.

In such a case, the desired and interfering terms have different rotations. In order to apply interference whitening in I and Q, the received signal may be rotated by $$e^{-\frac{j\pi n}{2}}$$

(the rotation associated with the interferer's modulation) so that the correlation in I and Q can be exploited with a simple linear 2-D filter. De-rotating the received signal with respect to the interferer rotation yields:

$$t(n) = r(n)e^{-\frac{j\pi n}{2}} = \left\{\sum_{k=0}^{L-1} h(k)s(n-k)\right\} e^{-\frac{j\pi n}{8}} + \left\{\sum_{k=0}^{L-1} g(k)i(n-k)\right\} + u(n) \quad (2)$$

$$= \left\{\sum_{k=0}^{L-1} h(k)e^{-\frac{j\pi k}{8}} s(n-k)e^{-\frac{j\pi(n-k)}{8}}\right\} + \left\{\sum_{k=0}^{L-1} g(k)i(n-k)\right\} + u(n) \quad (3)$$

$$= \left\{\sum_{k=0}^{L-1} \hat{h}(k)\hat{s}(n-k)\right\} + \left\{\sum_{k=0}^{L-1} g(k)i(n-k)\right\} + u(n), \quad (4)$$

where $$\hat{h}(k) = h(k)e^{-\frac{j\pi k}{8}} \quad (5)$$

$$\hat{s}(n) = s(n)e^{-\frac{j\pi k}{8}} \quad (6)$$

In matrix form, Equation 4 can be written as:

$$\begin{bmatrix} t_I(n) \\ t_Q(n) \end{bmatrix} = \sum_{k=0}^{L-1} \begin{bmatrix} \hat{h}_I(k) & -\hat{h}_Q(k) \\ \hat{h}_Q(k) & \hat{h}_I(k) \end{bmatrix} \begin{bmatrix} \hat{s}_I(n-k) \\ \hat{s}_Q(n-k) \end{bmatrix} + \quad (7)$$

$$\sum_{k=0}^{L-1} \begin{bmatrix} g_I(k) \\ g_Q(k) \end{bmatrix} i(n-k) + \sum_{k=0}^{L-1} \begin{bmatrix} u_I(n) \\ u_Q(n) \end{bmatrix}.$$

In terms of s(n), Equation 7 can be written as:

$$\begin{bmatrix} t_I(n) \\ t_Q(n) \end{bmatrix} = \sum_{k=0}^{L-1} \begin{bmatrix} \hat{h}_I(k) & -\hat{h}_Q(k) \\ \hat{h}_Q(k) & \hat{h}_I(k) \end{bmatrix} \begin{bmatrix} \cos\left(\frac{\pi(n-k)}{8}\right) & -\sin\left(\frac{\pi(n-k)}{8}\right) \\ \sin\left(\frac{\pi(n-k)}{8}\right) & \cos\left(\frac{\pi(n-k)}{8}\right) \end{bmatrix} \begin{bmatrix} s_I(n-k) \\ s_Q(n-k) \end{bmatrix}. \quad (8)$$

$$+ \sum_{k=0}^{L-1} \begin{bmatrix} g_I(k) \\ g_Q(k) \end{bmatrix} i(n-k) + \sum_{k=0}^{L-1} \begin{bmatrix} u_I(k) \\ u_Q(k) \end{bmatrix}.$$

An alternative way to write equation (8) is to use a matrix representation of the symbols and a vector representation of the rotation. This yields:

$$\begin{bmatrix} t_I(n) \\ t_Q(n) \end{bmatrix} = \quad (9)$$

-continued $$\sum_{k=0}^{L-1} \begin{bmatrix} \hat{h}_I(k) & -\hat{h}_Q(k) \\ \hat{h}_Q(k) & \hat{h}_I(k) \end{bmatrix} \begin{bmatrix} s_I(n-k) - s_Q(n-k) \\ s_Q(n-k) & s_I(n-k) \end{bmatrix} \begin{bmatrix} \cos\left(\frac{\pi(n-k)}{8}\right) \\ \sin\left(\frac{\pi(n-k)}{8}\right) \end{bmatrix} +$$

$$\sum_{k=0}^{L-1} \begin{bmatrix} g_I(k) \\ g_Q(k) \end{bmatrix} i(n-k) + \begin{bmatrix} u_I(n) \\ u_Q(n) \end{bmatrix}.$$

Denoting the following:

$$t(n) = \begin{bmatrix} t_I(n) \\ t_Q(n) \end{bmatrix} \quad (10)$$

$$H(k) = \begin{bmatrix} \hat{h}_I(k) & -\hat{h}_Q(k) \\ \hat{h}_Q(k) & \hat{h}_I(k) \end{bmatrix} \quad (11)$$

$$R(k) = \begin{bmatrix} \cos\left(\frac{\pi k}{8}\right) & -\sin\left(\frac{\pi k}{8}\right) \\ \sin\left(\frac{\pi k}{8}\right) & \cos\left(\frac{\pi k}{8}\right) \end{bmatrix} \quad (12)$$

$$\theta(k) = \begin{bmatrix} \cos\left(\frac{\pi k}{8}\right) \\ \sin\left(\frac{\pi k}{8}\right) \end{bmatrix} \quad (13)$$

$$\Omega = \begin{bmatrix} \cos\left(\frac{\pi}{8}\right) & -\sin\left(\frac{\pi}{8}\right) \\ \sin\left(\frac{\pi}{8}\right) & \cos\left(\frac{\pi}{8}\right) \end{bmatrix} \quad (14)$$

$$s(n) = \begin{bmatrix} s_I(n) \\ s_Q(n) \end{bmatrix} \quad (15)$$

$$S(n) = \begin{bmatrix} s_I(n) & -s_Q(n) \\ s_Q(n) & s_I(n) \end{bmatrix} \quad (16)$$

$$g(k) = \begin{bmatrix} g_I(k) \\ g_Q(k) \end{bmatrix}, \text{ and} \quad (17)$$

$$u(n) = \begin{bmatrix} u_I(n) \\ u_Q(n) \end{bmatrix}, \quad (18)$$

then:

$$t(n) = \sum_{k=0}^{L-1} H(k)R(n-k)s(n-k) + \sum_{k=0}^{L-1} g(k)i(n-k) + u(n) \quad (19)$$

$$= \sum_{k=0}^{L-1} H(k)S(n-k)\theta(n-k) + \sum_{k=0}^{L-1} g(k)i(n-k) + u(n) \quad (20)$$

The vector impairment signal q(n) is given by:

$$q(n) = \sum_{k=0}^{L-1} g(k)i(n-k) + u(n) \quad (21)$$

The vector impairment signal q(n) can be modeled as a 2-D AR process, and therefore, a 2-D filter with coefficients A(n), n=0, . . . , M−1 can be used to whiten the impairment process. The resulting impairment whitened output, denoted by v(n) may be given by:

$$v(n) = \sum_{m=0}^{M-1} A(m)t(n-m) \quad (22)$$

$$= \sum_{m=0}^{M-1} A(m) \sum_{k=0}^{L-1} H(k)R(n-m-k)s(n-m-k) + \sum_{m=0}^{M-1} A(m)q(n-m) \quad (23)$$

$$= \sum_{m=0}^{L+M-2} P(m)R(n-m)s(n-m) + x(n), \text{ or} \quad (24)$$

$$= \sum_{m=0}^{L+M-2} P(m)S(n-m)\theta(n-m) + x(n), \quad (25)$$

where x(n) denotes the whitened impairment signal and P(n) is an impairment whitened channel model obtained by the matrix convolution of A(n) and H(n), as shown below:

$$P(n) = \sum_{j=\max(0,n-L+1)}^{j=\min(n,M-1)} A(j)H(n-j). \quad (26)$$

Calculation of the whitening filter parameters A(n) can be done over a training sequence portion of the received signal, where the channel of the desired signal can be calculated, and an estimate of the impairment signal can be generated and fit to the $2^{nd}$ order AR model.

According to exemplary embodiments of the invention, a demodulator may be implemented as follows:

1) Generate a whitening filter and channel model from a received signal by rotating the signal by $$e^{-\frac{j\pi n}{2}},$$

and using a generalized least squares or joint least squares algorithm to calculate the channel of the desired signal and the whitening filter for the interferer. A rotated version of the training sequence may need to be used, which could add to the complexity. Alternatively, the channel model and whitening filter may be estimated by:

rotating the signal by $$e^{-j\frac{3\pi n}{8}}$$

(the rotation of the desired signal's modulation);

calculating the channel estimate for the desired signal (because the training sequence may be BPSK-based, the complexity of this operation may be low);

subtracting the signal contribution to obtain a residual;

rotating the residual by $$e^{-j\frac{\pi n}{8}}$$

(representing a rotation difference between the desired signal's modulation and the interferer's modulation);

resolving (vectorizing) the resultant into I and Q components;

calculating the whitening filter using the vectorized rotated residual; and iteratively performing the channel estimation and whitening filter operations to refine the channel estimates and the whitening filter estimates.

2) The whitening filter may then be applied to the received signal rotated by $$e^{-j\frac{\pi n}{2}},$$

to produce a signal v(n) modeled by equation (24) or equation (25).

3) The impairment whitened channel model P(n) may then be determined based on the whitening filter coefficients and the channel model h(n).

4) A Viterbi algorithm may then be performed using the model in equation (24) or equation (25) and postulates of the symbol sequence s(n), with the metric being given by:

$$M = e^T e \quad (27)$$

$$e = v(n) - \hat{v}(n) \quad (28)$$

$$\hat{v}(n) = \sum_{m=0}^{L+M-2} P(m) R(n-M) \tilde{s}(n-m) \text{ or} \quad (29)$$

$$\hat{v}(n) = \sum_{m=0}^{L+M-2} P(m) \tilde{S}(n-M) \theta(n-m) \quad (30)$$

where $\tilde{s}$ and $\tilde{S}$ are hypotheses of the symbol sequence s(n).

In the present application, FIGS. 1–8 are diagrams illustrating exemplary apparatus and operations according to embodiments of the present invention. It will be understood that operations depicted in the diagrams, and combinations thereof, may be implemented using one or more electronic circuits, such as circuits included in a component of a wireless communications system or in a wireless terminal. It will also be appreciated that, in general, operations depicted in the diagrams, and combinations thereof, may be implemented in one or more electronic circuits, such as in one or more discrete electronic components, one or more integrated circuits (ICs), one or more application specific integrated circuits (ASICs), and application specific circuit modules, as well as by computer program instructions which may be executed by a computer or other data processing apparatus, such as a microprocessor or digital signal processor (DSP), to produce a machine such that the instructions which execute on the computer or other programmable data processing apparatus create electronic circuits or other means that implement the specified operations. The computer program instructions may also be executed on one or more computers or other data processing apparatus to cause a series of actions to be performed by the computer(s) or other programmable apparatus to produce a computer implemented process that includes the specified operations.

The computer program instructions may also be embodied in the form of a computer program product in a computer-readable storage medium, i.e., as computer-readable program code embodied in the medium for use by or in connection with an instruction execution system. The computer-readable storage medium may include, but is not limited to, electronic, magnetic, optical or other storage media, such as a magnetic or optical disk or an integrated circuit memory device. For example, the computer program instructions may be embodied in memory included in a component of a wireless communications apparatus and/or storage medium operable to program such memory. Accordingly, blocks of the schematic diagrams of FIGS. 1–8 support electronic circuits and other apparatus that perform the specified operations, acts for performing the specified operations, and computer program products configured to perform the specified operations.

Figure 1:
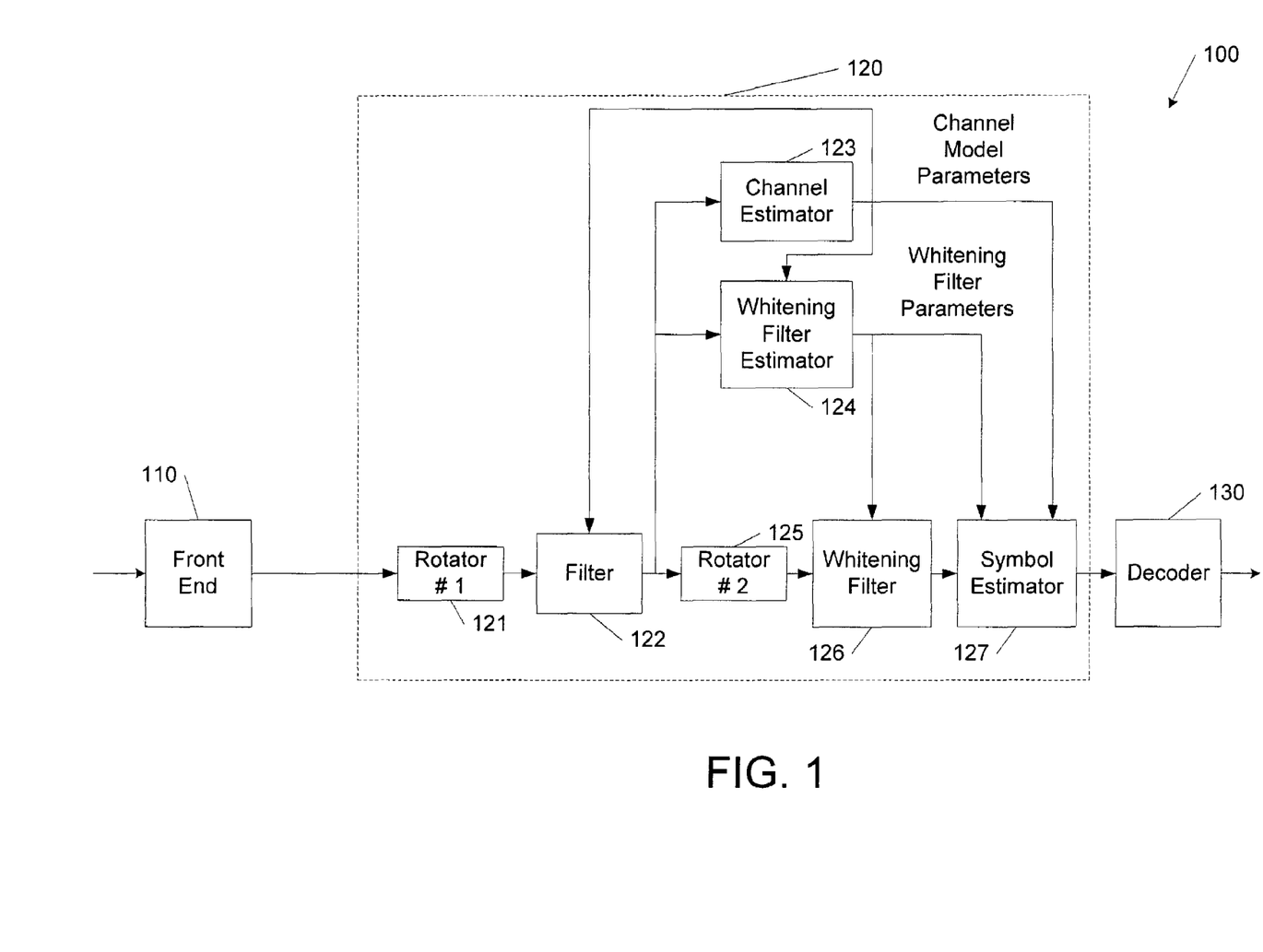
FIG. 1 is a schematic diagram of a receiver according to some embodiments of the present invention.

FIG. 1 illustrates an exemplary receiver 100 according to some embodiments of the present invention. The receiver 100 includes a front end 110, which may include, for example, filters, mixers and other circuitry that is known to those skilled in the art and will not be discussed in further detail herein. The receiver 100 further includes an impairment whitening demodulator 120 that includes a first rotator 121, a second rotator 125, a channel estimator 123, a whitening filter parameter estimator 124 that estimates whitening filter parameters for a whitening filter 126, and a symbol estimator 127. The receiver 100 may further include a decoder 130 and other circuitry for processing symbol estimates produced by the symbol estimator 127.

As shown, the demodulator 120 may further include a channel energy compensating filter 122 to allow the use of a reduced state estimation process in the symbol estimator 127. The filter 122 can be derived from the channel model produced by the channel estimator 123 and can maximize the energy of the leading channel steps of the effective channel response. If a more computationally intense MSLE process is employed, the filter 122 may not be needed.

The channel estimator 123 and the whitening filter parameter estimator 124 generate a channel model for the desired signal and parameters of a whitening filter for the interferer signal, respectively, using, for example, one of the alternative techniques described above. The first rotator 121 applies a rotation associated with the desired signal's modulation (e.g., 8-PSK) to the signal received from the front end 110. The resulting signal is filtered by channel energy compensating filter 122. The second rotator 125 applies an addition rotation to the filter signal to align with the rotation of the interfering signal before filtering by the whitening filter 126 to produce a filtered signal corresponding to the signal v(n) described above with reference to equations (24) and (25). The symbol estimator 127 then generates symbol estimates responsive to the channel model and the whitening filter parameters, e.g., selects symbol hypotheses for the desired signal using a Viterbi algorithm with a metric that is based on the channel model and the whitening filter parameters, as described above.

Figure 2:
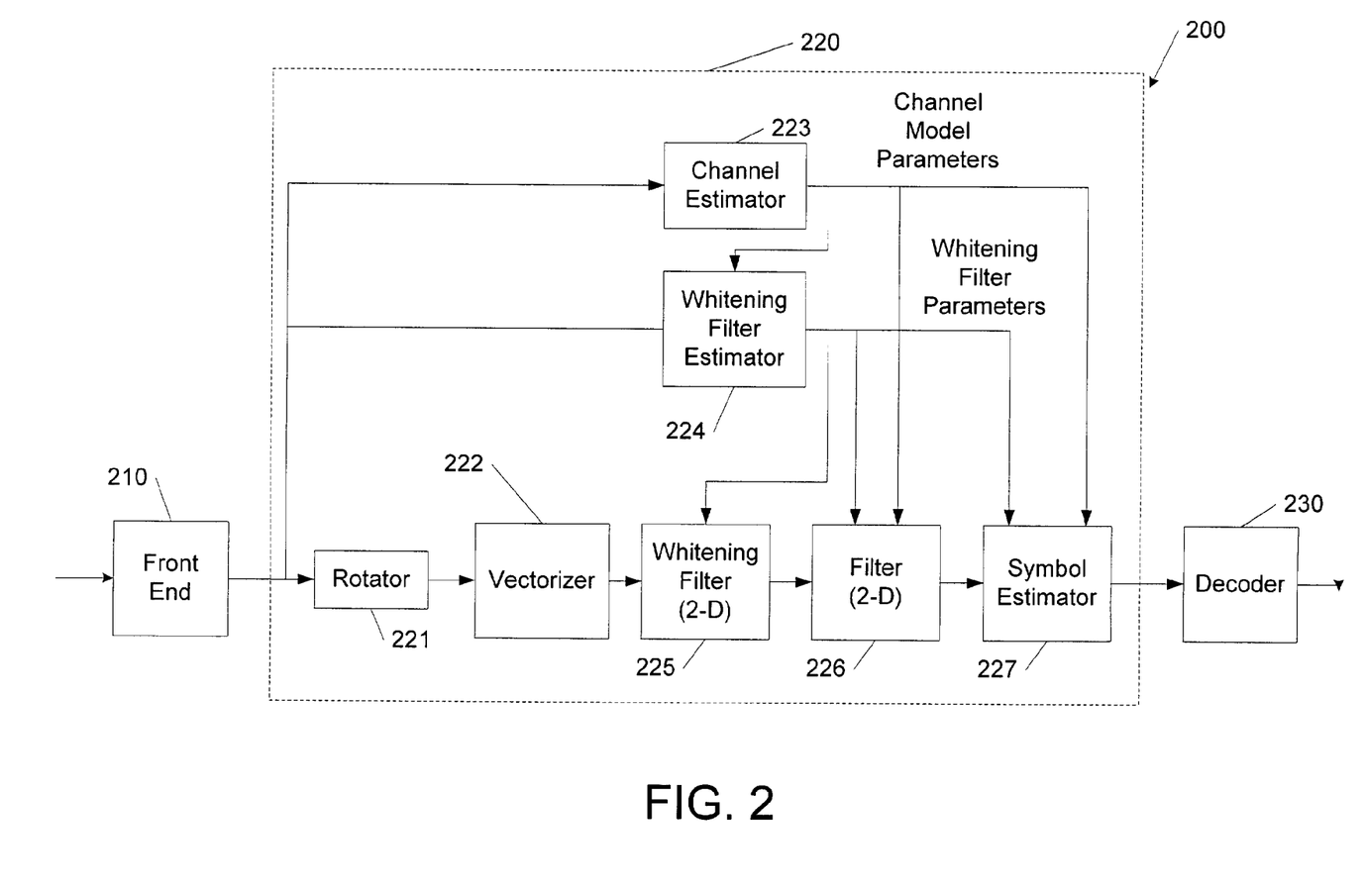
FIG. 2 is a schematic diagram of a receiver according to further embodiments of the present invention

FIG. 2 illustrates alternative embodiments according to the present invention. A receiver 200 includes a front end 210, which may include, for example, filters, mixers and other circuitry that is known to those skilled in the art and will not be discussed in further detail herein. The receiver 200 further includes an impairment whitening demodulator 220 that includes a rotator 221, a vectorizer 222, a channel estimator 223, a whitening filter parameter estimator 224 that estimates whitening filter parameters for a whitening filter 225, a channel energy compensating filter 226, and a symbol estimator 227. The receiver 200 may further include a decoder 230 and other circuitry for processing symbol estimates produced by the symbol estimator 227.

The channel estimator 223 and the whitening filter parameter estimator 224 generate a channel model for the desired signal and parameters of a whitening filter for the interferer signal, respectively, using, for example, one of the alternative techniques described above. The rotator 221 applies a rotation associated with the interfering signal's modulation (e.g., GMSK) to the signal received from the front end 210. The resulting signal is vectorized into I and Q components by the vectorizer 222 before filtering by the two-dimensional whitening filter 225 and the channel energy compensating filter 226 (here, a two-dimensional filter) to produce a filtered signal corresponding to the signal v(n) described above with reference to equations (24) and (25). The symbol estimator 227 then generates symbol estimates responsive to the channel model and the whitening filter parameters, e.g., selects symbol hypotheses for the desired signal using a Viterbi algorithm with a metric that is based on the channel model and the whitening filter parameters, as described above.

Figure 3:
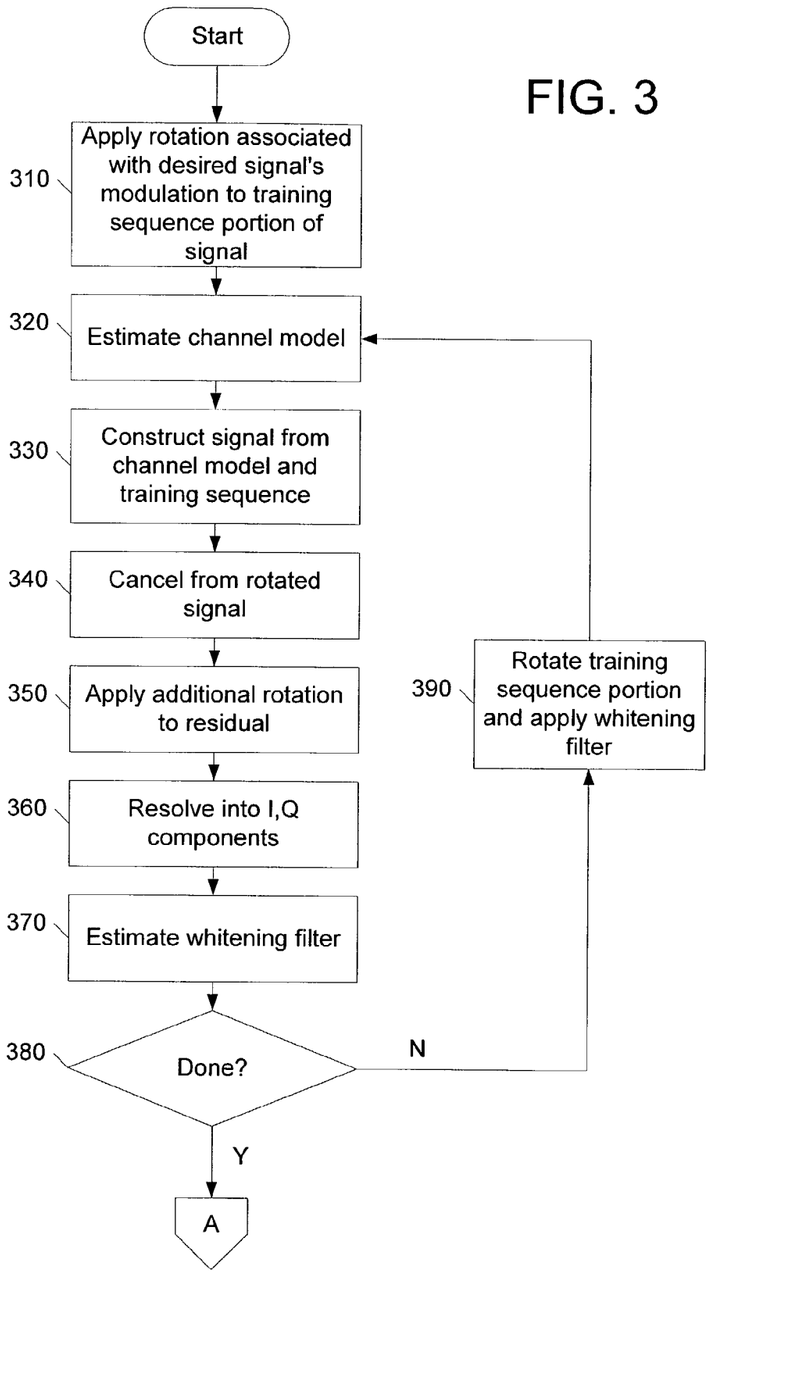
FIGS. 3–5 are flowcharts illustrating signal processing operations according to further embodiments of the present invention.

FIG. 3 illustrates exemplary operations for estimating the desired signal's channel model and the whitening filter for the interferer according to some embodiments of the invention. A rotation associated with the desired signal's modulation (e.g., 8-PSK) is applied to a training sequence portion of a received signal (e.g., a prefiltered signal) (Block 310). A channel model for the desired signal is then estimated from the rotated signal (Block 320). This channel model may then be used to generate a replica of a training sequence portion of the desired signal (Block 330), which may, in turn, be canceled from the rotated signal to generate a residual signal (Block 340). Additional rotation corresponding to a rotation difference between the desired signal's modulation and the interfering signal's modulation is then applied to the residual signal (Block 350), and the resulting rotated signal is resolved (vectorized) into I and Q components (Block 360). A whitening filter is then estimated from the vectorized signal (Block 370). The channel model may be iteratively refined, e.g., by rotating the training portion sequence, applying the whitening filter, and re-estimating the channel model (Blocks 380, 390, 320). The whitening filter may also be iteratively refined, e.g., by applying the operations of Blocks 330–370 using the refined channel model.

Figure 4:
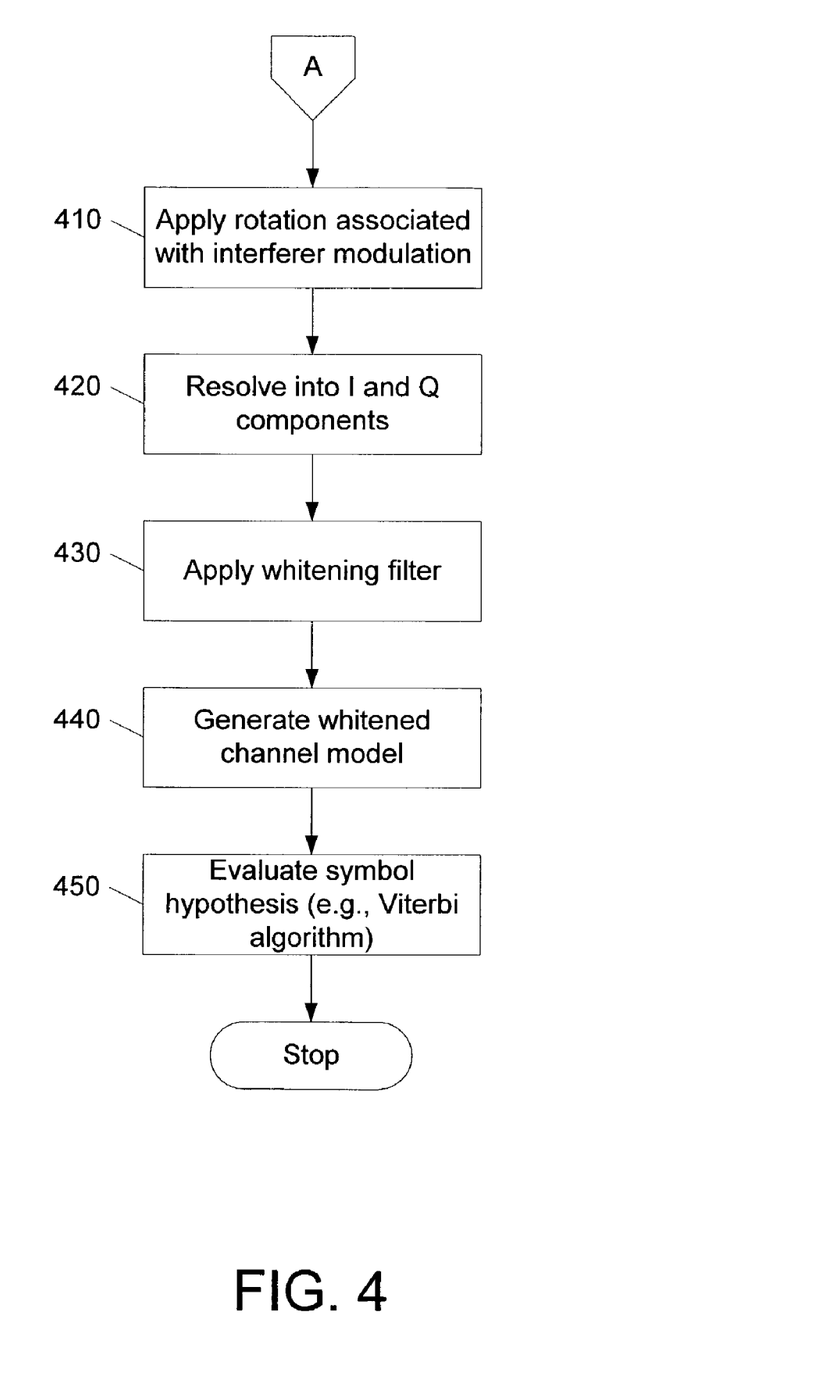

When a desired level of accuracy is achieved (A of FIG. 3), the estimated channel model and whitening filter may be used to generate symbol estimates (A of FIG. 4). Referring now to FIG. 4, a rotation corresponding to the interferer modulation (e.g., a rotation associated with GMSK) may be applied to the received signal (Block 410), which may be prefiltered as described above. The rotated signal may then be resolved into I and Q components (Block 420). The previously estimated 2-D whitening filter may then be applied to the resulting I and Q component signals (Block 430), and a whitened channel model may be determined from the resulting impairment-whitened I & Q component signals (Block 440). A symbol hypothesis may then be evaluated (Block 450) using, for example, a Viterbi algorithm with a metric that is a function of the whitened channel model as described above with reference to equations (25) and (26).

Figure 5:
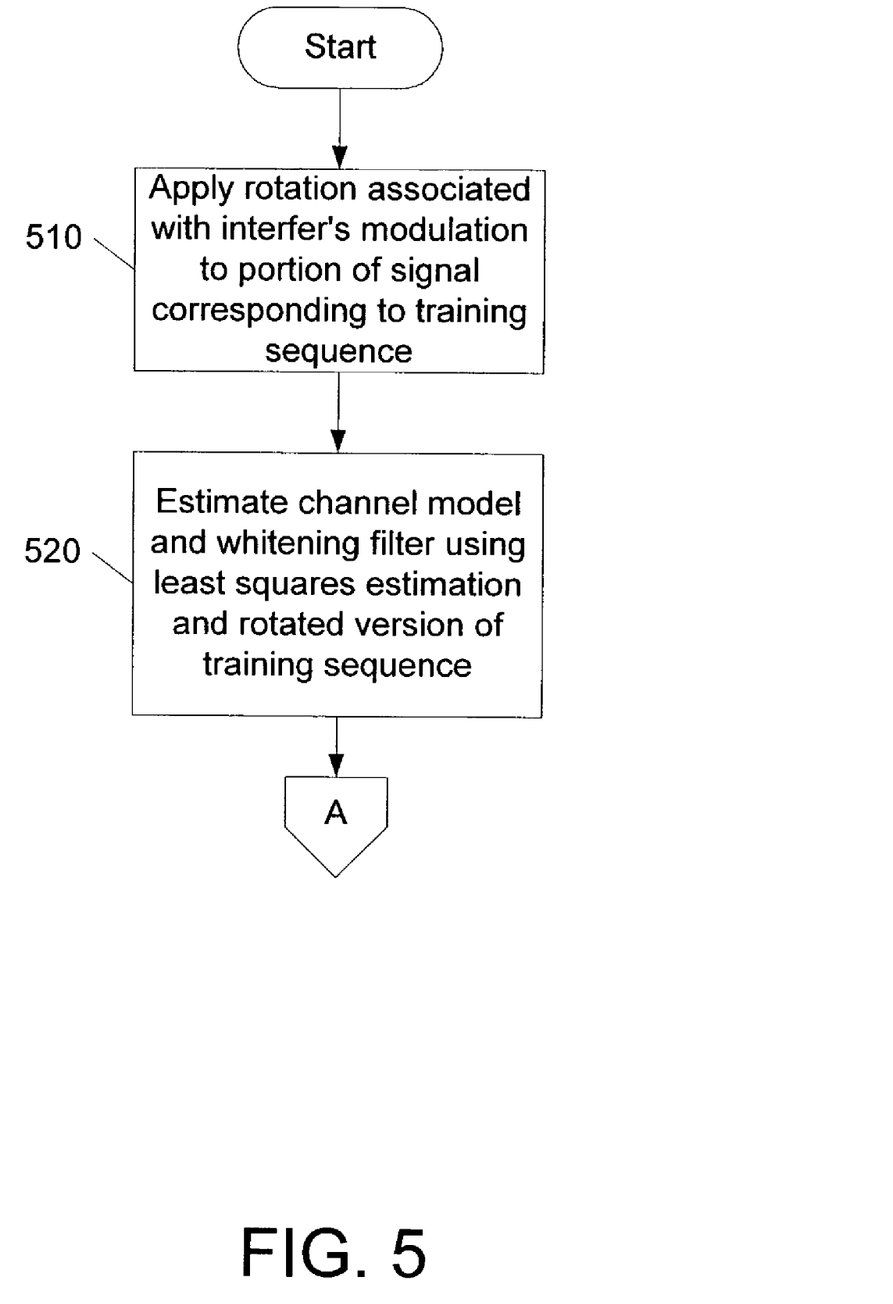

FIG. 5 illustrates alternative operations for determining a channel model and whitening filter according to other embodiments of the invention. A rotation associated with an interferer's modulation (e.g., GMSK) is applied to a training sequence portion of a received signal, which may be prefiltered as described above (Block 510). A channel model and whitening filter may be jointly determined from the rotated signal using a least square estimation process based on a rotated version of the training sequence (Block 520). Symbol estimation operations may then proceed at A, as described above.

Equations (24) and (25) above lend themselves to many possible implementations of branch metric calculations. For example, a symbol may selected directly using the impairment whitened channel coefficients P(n), the hypothesized symbols and knowledge of symbol position to calculate the appropriate rotation. Alternatively, multiple sets of matrix coefficients, i.e., multiple versions (i.e., multiple instantaneous channel estimates) of the whitened channel coefficient P(n) corresponding to postmultiplication by different values of the finite number of values of the rotation function R(n), may be precomputed, as only a finite number of combinations are possible. For each symbol position, one set of matrix coefficients may be used to evaluate symbol hypotheses. This latter approach may be simpler, and may also offer the possibility of precalculating and storing the hypothesized values, though the number of possibilities may far exceed the number that need to be stored for a normal DFSE-based equalizer that does not do I-Q processing in two dimensions.

Fortunately, a significant simplification is possible if equation (25) may be used to calculate the metrics. This simplification is possible by realizing that:

$$\theta(n+k) = R(k)\theta(n). \tag{31}$$

Equation (31) may be proved by direct substitution. It may also be verified that:

$$R(k) = \Omega^k. \tag{32}$$

From equations (31) and (32), hypothesized signals ($\hat{v}(n)$) or for successive time instants may be calculated in a recursive fashion. For a hypothesized symbol sequence represented by $\tilde{S}(n)$:

$$\hat{v} = \sum_{m=0}^{L+M-2} P(m)\tilde{S}(n-m)\theta(n-m) \tag{33}$$

$$= \left\{ \sum_{m=0}^{L+M-2} P(m)\tilde{S}(n-m)\Omega^{L+M-2-m} \right\} \theta(n-L-M+2) \tag{34}$$

For the same hypothesized symbol sequence represented by $\tilde{S}(n)$, the hypothesized signal at the next instant is given by:

$$\hat{v}(n+1) = \sum_{m=0}^{L+M-2} P(m)\tilde{S}(n-m)\theta(n-m+1) \tag{35}$$

$$= \left\{ \sum_{m=0}^{L+M-2} P(m)\tilde{S}(n-m)\Omega^{L+M-2-m} \right\} \theta(n-L-M+3) \tag{36}$$

$$= \left\{ \sum_{m=0}^{L+M-2} P(m)\tilde{S}(n-m)\Omega^{L+M-2-m} \right\} \Omega\theta(n-L-M+2) \tag{37}$$

and multiplying the result by a vector equal to the product of an appropriate power of Ω and an initially chosen θ(n). There are a finite number of such vectors and, thus, it may be worthwhile to store these vectors and multiply them by V depending on the time index. It is also possible to trade off storage for complexity by storing subsets of V, for example, using only two symbols at a time, and multiplying the stored values by a power of Ω to obtain matrices that can be added together to form V. Using these techniques for precalculating hypothesized signals, the complexity of the equalization can be reduced.

According to further aspects of the invention, an adaptive choice of receiver algorithm may be made. For example, the receiver may detect if the modulation of a desired signal is 8-PSK or GMSK using different rotated versions of a training sequence. One way to do this is to take the color of the impairment into account.

After modulation detection, the nature of the impairment may then be detected. One way to do this is to postulate an I-Q correlated interferer and a temporally correlated interferer, calculate the whitening parameters, obtain the residual after whitening and base a decision on the residual energy. For 8-PSK, this may be somewhat involved due to the disparate rotations, but the techniques described above could be used. The proper demodulation technique may then be chosen based on the nature of the detected desired and interferer modulation.

Figure 6:
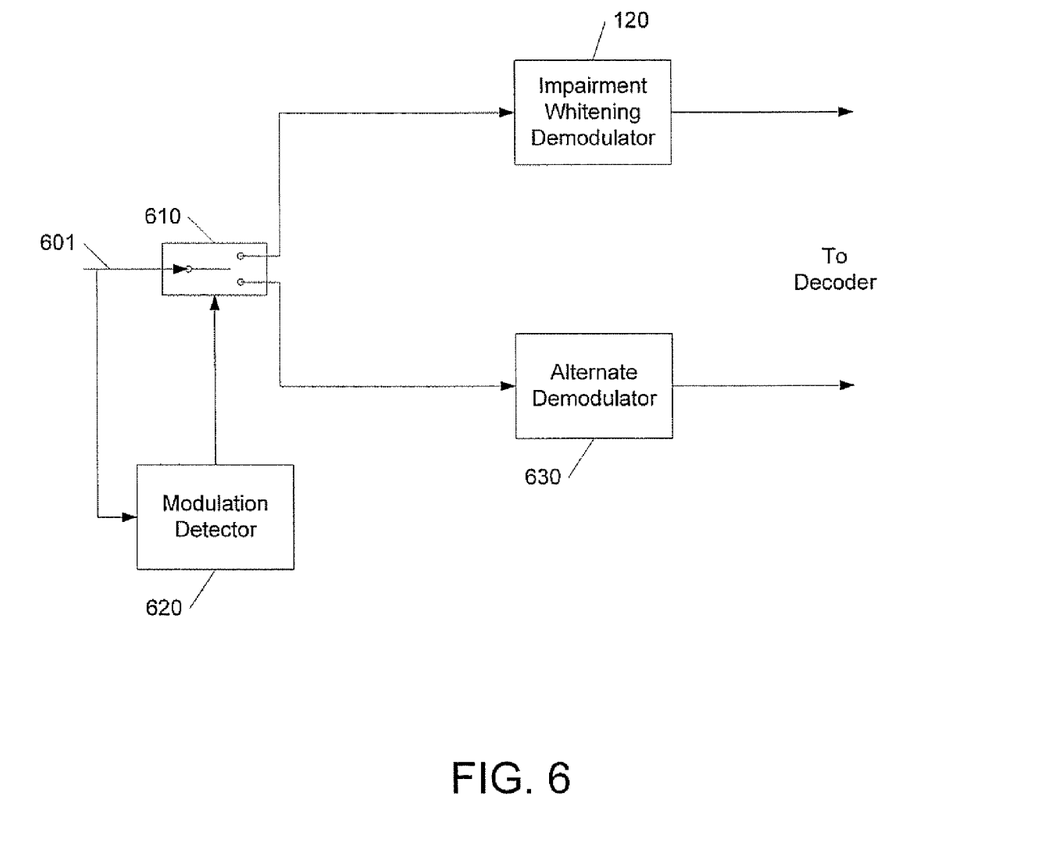
FIG. 6 is a schematic diagram of a selective demodulator according to some embodiments of the present invention.

FIG. 6 illustrates apparatus and operations for performing alternative demodulations based on detected modulations according to further embodiments of the invention. A modulation detector 620 detects the modulation type or types (e.g., GMSK, 8-PSK, or other) of desired and/or interfering signals present in a received signal 601. A selector 610 is responsive to the modulation detector 620 and selectively applies the received signal 601 to a first demodulator, e.g., a demodulator 120 that is tailored to suppressing GMSK-modulated interference mixed with an 8-PSK-modulated desired signal as described above with reference to FIG. 1, or a second, alternative demodulator 630 that may be tailored to other combinations of desired and interferer modulations. For example, the second demodulator 630 may be tailored to demodulate a desired GMSK signal in the presence of GMSK interference, as described in the U.S. Provisional Application Serial No. 60/359,911, entitled "Robust Interference Rejection via Impairment Detection," to Arslan et al., filed Feb. 28, 2002.

It will be appreciated that the present invention may be implemented in a variety of different ways, including, but not limited to, in receivers used in wireless communications systems. For example, the present invention may be implemented as methods, including, but not limited to, methods of operating a wireless communications system, methods of operating a wireless base station, and methods of operating a wireless terminal. It also will be understood that the present invention may be embodied in apparatus, including, but not limited to, wireless communications systems, wireless base stations, wireless terminals, modules for use in wireless base stations and/or terminals, and ASICs for use in wireless base station and/or wireless terminals. It will be further appreciated that the present invention may be embodied as computer program products configured to be executed in an apparatus such as a wireless base station or a wireless terminal, such that apparatus and/or acts according to the invention may be provided.

Figure 7:
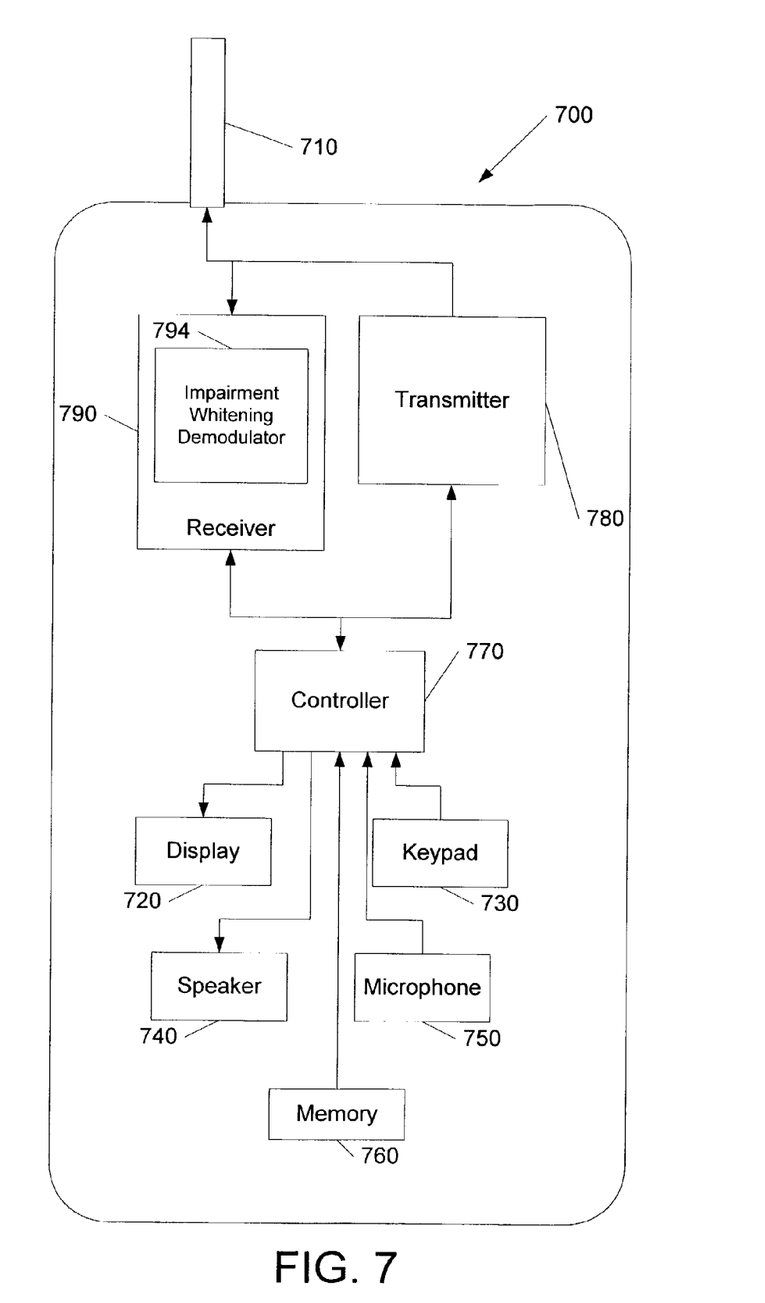
FIG. 7 is a schematic diagram of a wireless terminal according to some embodiments of the present invention.

For example, as illustrated in FIG. 7, a wireless terminal 700 according to some embodiments of the invention may include a controller 770 (e.g., a microprocessor or microcontroller) that is operatively associated with a display 720, a keypad 730, a speaker 740, a microphone 750, and memory 760. The controller 770 is also operatively associated with a transmitter 780 and a receiver 790, which transmit and receive signals via an antenna 710 under control of the controller 770. The receiver 700 includes an impairment whitening demodulator 794 that is operative to suppress interference using one or more of the techniques described herein. For example, the impairment whitening demodulator 794 may be operative to recover an 8-PSK modulated signal in the presence of GMSK interference, as described above. It will be appreciated that the receiver 790 may also implement other demodulation techniques, such as those that recover a GMSK desired signal in the presence of GMSK interference, as also described above.

Figure 8:
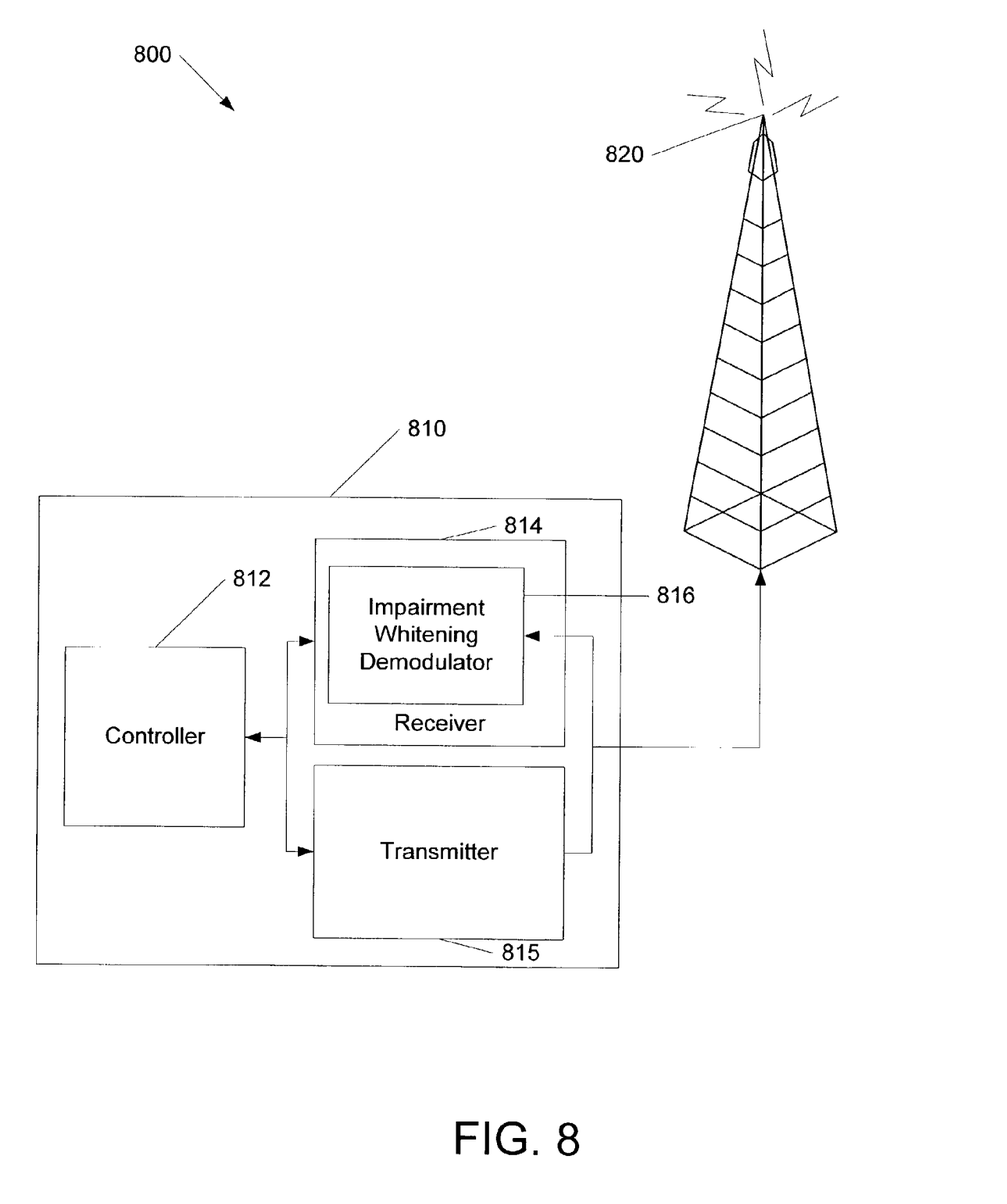
FIG. 8 is a schematic diagram of a wireless base station according to embodiments of the present invention.

As shown in FIG. 8, a base station 800 according to some embodiments of the present invention may include base station electronics 810 that include a controller 812 that controls a receiver 814 and a transmitter 815. The receiver 814 and the transmitter 815 are operative to send and receive radio signals via an antenna 820. As shown, the receiver 814 includes an impairment whitening demodulator 816 that is operative to recover a desired signal, for example, an 8-PSK signal, in the presence of dissimilarly modulated interference, for example, GMSK interference, using the interference suppression techniques described herein. It will be understood that, in general, the present invention is applicable to other applications, and may be implemented in other environments that those illustrated in FIGS. 7 and 8.

In the drawings and specification, there have been disclosed exemplary embodiments of the invention. Although specific terms are employed, they are used in a generic and descriptive sense only and not for purposes of limitation.

That which is claimed is:

1. A method of recovering information from a composite signal including first and second component signals modulated according to respective first and second modulations, the method comprising:
   processing the composite signal based on predetermined characteristics of the first and second modulations to generate a channel model for the first component signal and a whitening filter for the second component signal;
   processing the composite signal according to the whitening filter to generate a filtered signal; and
   evaluating a symbol hypothesis for a symbol of the first component signal using a metric with respect to the filtered signal that is a function of the whitening filter and the channel model.

2. The method of claim 1, wherein processing the composite signal based on predetermined characteristics of the first and second modulations to generate a channel model for the first component signal and a whitening filter for the second component signal comprises:
   applying a rotation associated with the first modulation to the composite signal;
   generating the channel model from the rotated signal based on known information;
   canceling a component associated with the known information from the rotated signal based on the channel model to generate a residual signal;
   applying a rotation corresponding to a rotation difference between the first modulation and the second modulation to the residual signal; and
   generating the whitening filter from the rotated residual signal.

3. The method of claim 2, wherein generating the channel model from the rotated signal based on known information comprises generating a first estimate of the channel model, and further comprising:
   applying a rotation associated with the second modulation to the composite signal;
   applying the whitening filter to the rotated composite signal to generate a whitened signal; and
   generating a second estimate of the channel model from the whitened signal based on the known information.

4. The method of claim 2, wherein generating the whitening filter from the rotated residual signal comprises generating a first estimate of the whitening filter, and further comprising:
   canceling a component associated with the known information from the rotated whitened signal based on the second estimate of the channel model to generate a second residual signal;
   applying the rotation corresponding to a rotation difference between the first modulation and the second modulation to the second residual signal; and
   generating a second estimate of the whitening filter from the rotated second residual signal.

5. The method of claim 1, wherein processing the composite signal based on predetermined characteristics of the first and second modulations to generate a channel model for the first component signal and a whitening filter for the second component signal comprises:
   applying a rotation associated with the second modulation to the composite signal; and
   estimating the whitening filter and the channel model from the rotated signal using a least squares estimation process based on a known training sequence.

6. The method of claim 1, comprising selecting symbol hypotheses according to a sequence estimation algorithm that uses the metric with respect to the filtered signal that is a function of the whitening filter and the channel model.

7. The method of claim 6, wherein the whitening filter is multi-dimensional, and wherein selecting symbol hypotheses according to a sequence estimation algorithm that uses the metric with respect to the filtered signal that is a function of the whitening filter and the channel model comprises selecting symbol hypotheses according to a multi-dimensional Viterbi algorithm that uses the metric with respect to the filtered signal that is a function of the whitening filter and the channel model.

8. The method of claim 1:
   wherein processing the composite signal according to the whitening filter to generate a filtered signal comprises:
      applying a rotation associated with the second modulation to the composite signal; and
      applying the whitening filter to the rotated signal to generate the filtered signal; and
   wherein evaluating a symbol hypothesis for a symbol of the first component using a metric with respect to the filtered signal that is a function of the whitening filter and the channel model comprises:
      generating a whitened channel model from the whitening filter and the channel model; and
      evaluating a symbol hypothesis for the symbol using a metric with respect to the filtered signal that is a function of the whitened channel model.

9. The method of claim 8:
   wherein the metric includes a product of the whitened channel model and a rotation function that is a function of symbol position and that has a finite number of possible values;
   wherein evaluating a symbol hypothesis for a symbol of the first component signal using a metric with respect to the filtered signal that is a function of the whitened channel model is preceded by:
      determining values for the product of the whitened channel model and respective ones of the possible values of the rotation function; and
      storing the determined values; and
   wherein evaluating a symbol hypothesis for a symbol of the first component signal using a metric with respect to the filtered signal that is a function of the whitened channel model comprises evaluating a symbol hypothesis for a symbol position by computing the metric using a selected one of the stored values that corresponds to the symbol position.

10. The method of claim 1, wherein said step of evaluating a symbol hypothesis for the first component signal using a metric with respect to the filtered signal that is a function of the whitening filter and the channel model is conditionally performed responsive to detection of the second modulation.

11. The method of claim 1 wherein the first modulation comprises a multi-dimensional modulation and wherein the second modulation comprises a one-dimensional modulation.

12. The method of claim 11, wherein the first modulation comprises 8-PSK modulation, and wherein the second modulation comprises GMSK modulation.

13. The method of claim 11, wherein the first modulation comprises $$\frac{3\pi}{8}$$

-shifted 8-PSK modulation, and wherein the second modulation comprises GMSK modulation.

14. The method of claim 1, further comprising filtering the composite signal to control energy in the channel model.

15. A method of recovering a desired signal from a composite signal, the method comprising:
   generating a channel model for the desired signal and a whitening filter for an interfering signal having a modulation different than that of the desired signal;
   processing the composite signal according to the whitening filter to generate a filtered signal; and
   estimating the desired signal using a multi-dimensional estimation process that employs a metric with respect to the filtered signal that is a function of the whitening filter and the channel model.

16. The method of claim 15, wherein the desired signal is modulated according to a complex modulation and wherein the interfering signal is modulated according to a one-dimensional modulation.

17. The method of claim 16, wherein the desired signal is 8-PSK modulated, and wherein the interfering signal is GMSK modulated.

18. The method of claim 16, wherein the desired signal is $$\frac{3\pi}{8}$$

-shifted 8-PSK modulated, and wherein the interfering signal is GMSK modulated.

19. The method of claim 15, wherein generating a channel model for the desired signal and a whitening filter for the interfering signal comprises:
   applying a rotation associated with a modulation of the desired signal to the composite signal;
   generating the channel model from the rotated signal based on a known training sequence;
   canceling a component associated with the training sequence from the rotated signal based on the channel model to generate a residual signal;

applying a rotation corresponding to a rotation difference between a modulation of the interfering signal and the modulation of the desired signal to the residual signal; and generating the whitening filter from the rotated residual signal.

20. The method of claim 19, further comprising generating a refined estimate of the channel model using the whitening filter.

21. The method of claim 20, further comprising generating a refined estimate of the whitening filter from the refined estimate of the channel model.

22. The method of claim 15, wherein generating a channel model for the desired signal and a whitening filter for the interfering signal comprises:

applying a rotation associated with a modulation of the interfering signal to the composite signal; and applying a least squares estimation process to the rotated signal using a rotated version of a training sequence included in the desired signal to generate the whitening filter and the channel model.

23. The method of claim 15:

wherein processing the composite signal according to the whitening filter to generate a filtered signal comprises:

applying a rotation associated with a modulation of the interfering signal to the composite signal; and applying the whitening filter to the rotated signal to generate the filtered signal; and wherein estimating the desired signal using a multi-dimensional estimation process that employs a metric with respect to the filtered signal that is a function of the whitening filter and the channel model comprises:

generating a whitened channel model from the whitening filter and the whitening filter; and evaluating a symbol hypothesis for the desired signal using a metric with respect to the filtered signal that is a function of the whitened channel model.

24. The method of claim 23:

wherein the metric is a function of a product of the whitened channel model and a rotation function that is a function of symbol position and that has a finite number of possible values;

wherein estimating the desired signal using a multi-dimensional estimation process that employs a metric with respect to the filtered signal that is a function of the whitened channel model is preceded by:

determining values for the product of the whitened channel model and respective ones of the possible values of the rotation function; and storing the determined values; and wherein estimating the desired signal using a multi-dimensional estimation process that employs a metric with respect to the filtered signal that is a function of the whitened channel model comprises evaluating a symbol hypothesis for a symbol position by computing the metric using a selected one of the stored values that corresponds to the symbol position.

25. The method of claim 15, wherein the step of estimating the desired signal using a multi-dimensional estimation process that employs a metric wit respect to the filtered signal that is a function of the whitening filter and the channel model is conditionally performed responsive to detection of the interfering signal.

26. An apparatus for recovering information from a composite signal including first and second component signals modulated according to respective first and second modulations, the apparatus comprising:

means for processing the composite signal based on predetermined characteristics of the first and second modulations to generate a channel model for the first component signal and a whitening filter for the second component signal;

means for processing the composite signal according to the whitening filter to generate a filtered signal; and means for evaluating a symbol hypothesis for a symbol of the first component signal using a metric with respect to the filtered signal that is a function of the whitening filter and the channel model.

27. The apparatus of claim 26, wherein the means for processing the composite signal based on predetermined characteristics of the first and second modulations to generate a channel model for the first component signal and a whitening filter for the second component signal comprises:

means for applying a rotation associated with the first modulation to the composite signal;

means for generating the channel model from the rotated signal based on known information;

means for canceling a component associated with the known information from the rotated signal based on the channel model to generate a residual signal;

means for applying a rotation corresponding to a rotation difference between the first modulation and the second modulation to the residual signal; and means for generating the whitening filter from the rotated residual signal.

28. The apparatus of claim 27, wherein the means for processing the composite signal based on predetermined characteristics of the first and second modulations to generate a channel model for the first component signal and a whitening filter for the second component signal comprises means for iteratively generating a refined estimate of the channel model and/or the whitening filter from a previously generated estimate of the channel model and/or the whitening filter.

29. The apparatus of claim 26, wherein the means for processing the composite signal based on predetermined characteristics of the first and second modulations to generate a channel model for the first component signal and a whitening filter for the second component signal comprises:

means for applying a rotation associated with the second modulation to the composite signal; and means for estimating the whitening filter and the channel model from the rotated signal using a least squares estimation process based on a known training sequence.

30. The apparatus of claim 26, further comprising means for selecting symbol hypotheses according to a sequence estimation algorithm that uses the metric with respect to the filtered signal that is a function of the whitening filter and the channel model.

31. The apparatus of claim 30, wherein the whitening filter is multi-dimensional, and wherein the means for selecting symbol hypotheses according to a sequence estimation algorithm that uses the metric with respect to the filtered signal that is a function of the whitening filter and the channel model comprises means for selecting symbol hypotheses according to a multi-dimensional Viterbi algorithm that uses the metric with respect to the filtered signal that is a function of the whitening filter and the channel model.

32. The apparatus of claim 26, wherein the means for evaluating a symbol hypothesis for the first component signal using a metric with respect to the filtered signal that is a function of the whitening filter and the channel model is conditionally performed responsive to detection of interference modulated according to the second modulation in the composite signal.

33. The apparatus of claim 26 wherein the first modulation comprises a multi-dimensional modulation and wherein the second modulation comprises a one-dimensional modulation.

34. The apparatus of claim 26, wherein the first modulation comprises 8-PSK modulation, and wherein the second modulation comprises GMSK modulation.

35. The apparatus of claim 26, wherein the first modulation comprises $$\frac{3\pi}{8}$$

-shifted 8-PSK modulation, and wherein the second modulation comprises GMSK modulation.

36. A receiver, comprising:
an impairment whitening demodulator operative to generate a channel model for a first component signal of a composite signal and a whitening filter for a second component signal of a composite signal from the composite signal based on predetermined characteristics of first and second modulations applied to the first and second component signals, to filter the composite signal according to the whitening filter to generate a filtered signal, and to evaluate a symbol hypothesis for a symbol of the first component signal using a metric with respect to the filtered signal that is a function of the whitening filter and the channel model.

37. The receiver of claim 36, wherein the impairment whitening demodulator is operative to apply a rotation associated with the first modulation to the composite signal, to generate the channel model from the rotated signal based on known information, to cancel a component associated with the known information from the rotated signal based on the channel model to generate a residual signal, to apply a rotation corresponding to a rotation difference between the first modulation and the second modulation to the residual signal and to generate the whitening filter from the rotated residual signal.

38. The receiver of claim 36, wherein the impairment whitening demodulator is operative to apply a rotation associated with the second modulation to the composite signal and to estimate the whitening filter and the channel model from the rotated signal using a least squares estimation process based on a known training sequence.

39. The receiver of claim 36, wherein the impairment whitening demodulator comprises:
a channel estimator operative to generate parameters of the channel model responsive to the composite signal;
a whitening filter estimator operative to determining parameters of the whitening filter responsive to the composite signal;
a rotator operative to apply a rotation associated with the second modulation to the composite signal;
a configurable whitening filter operative to filter the rotated signal according to the generated whitening filter parameters; and
a symbol estimator operative to generate symbol estimates using a metric with respect to the filtered signal that is a function of the generated whitening filter parameters and the channel model parameters.

40. The receiver of claim 36, wherein the impairment whitening demodulator is operative to select symbol hypotheses according to a sequence estimation algorithm that uses the metric with respect to the filtered signal that is a function of the whitening filter and the channel model.

41. The receiver of claim 40, wherein the whitening filter is multi-dimensional, and wherein the impairment whitening demodulator is operative to select symbol hypotheses according to a multi-dimensional Viterbi algorithm that uses the metric with respect to the filtered signal that is a function of the whitening filter and the channel model.

42. The receiver of claim 36, wherein the impairment whitening demodulator evaluates a symbol hypothesis for the first component signal using a metric with respect to the filtered signal that is a function of the whitening filter and the channel model responsive to detection of the second modulation in the composite signal.

43. The receiver of claim 36 wherein the first modulation comprises a multi-dimensional modulation and wherein the second modulation comprises a one-dimensional modulation.

44. The receiver of claim 43, wherein the first modulation comprises 8-PSK modulation, and wherein the second modulation comprises GMSK modulatiom.

45. The receiver of claim 44, wherein the first modulation comprises $$\frac{3\pi}{8}$$

-shifted 8-PSK modulation, and wherein the second modulation comprises GMSK modulation.

46. The receiver of claim 43, further comprising a channel energy compensating filter.

47. A wireless terminal, comprising:
a receiver operative to generate a channel model for a first component signal of a composite signal and a whitening filter for a second component signal of a composite signal from the composite signal based on predetermined characteristics of first and second modulations applied to the first and second component signals, to filter the composite signal according to the whitening filter to generate a filtered signal, and to evaluate a symbol hypothesis for a symbol of the first component signal using a metric with respect to the filtered signal that is a function of the whitening filter and the channel model.

48. A wireless communications base station, comprising:
a receiver operative to generate a channel model for a first component signal of a composite signal and a whitening filter for a second component signal of a composite signal from the composite signal based on predetermined characteristics of first and second modulations applied to the first and second component signals, to filter the composite signal according to the whitening filter to generate a filtered signal, and to evaluate a symbol hypothesis for a symbol of the first component signal using a metric with respect to the filtered signal that is a function of the whitening filter and the channel model.

49. A computer program product for recovering information from a composite signal including first and second component signals modulated according to respective first and second modulations, the computer program product comprising computer-readable program code embodied in a computer-readable program storage medium, the computer-readable program code comprising:

program code configured to process the composite signal based on predetermined characteristics of the first and second modulations to generate a channel model for the first component signal and a whitening filter for the second component signal;

program code configured to process the composite signal according to the whitening filter to generate a filtered signal; and program code configured to evaluate a symbol hypothesis for a symbol of the first component signal using a metric with respect to the filtered signal that is a function of the whitening filter and the channel model.

50. The computer program product of claim 49, wherein the program code configured to process the composite signal based on predetermined characteristics of the first and second modulations to generate a channel model for the first component signal and a whitening filter for the second component signal comprises:

program code configured to apply a rotation associated with the first modulation to the composite signal;

program code configured to generate the channel model from the rotated signal based on known information;

program code configured to cancel a component associated with the known information from the rotated signal based on the channel model to generate a residual signal;

program code configured to apply a rotation corresponding to a rotation difference between the first modulation and the second modulation to the residual signal; and program code configured to generate the whitening filter from the rotated residual signal.

51. The computer program product of claim 49, wherein the program code configured to process the composite signal based on predetermined characteristics of the first and second modulations to generate a channel model for the first component signal and a whitening filter for the second component signal comprises:

program code configured to apply a rotation associated with the second modulation to the composite signal; and program code configured to estimate the whitening filter and the channel model from the rotated signal using a least squares estimation process based on a known training sequence.

52. The computer program product of claim 49, wherein the computer-readable program code further comprises program code configured to select symbol hypotheses according to a sequence estimation algorithm that uses the metric with respect to the filtered signal that is a function of the whitening filter and the channel model.

53. The computer program product of claim 52, wherein the whitening filter is multi-dimensional, and wherein the program code configured to select symbol hypotheses according to a sequence estimation algorithm that uses the metric with respect to the filtered signal that is a function of the whitening filter and the channel model comprises program code configured to select symbol hypotheses according to a multi-dimensional Viterbi algorithm that uses the metric with respect to the filtered signal that is a function of the whitening filter and the channel model.

* * * * *

UNITED STATES PATENT AND TRADEMARK OFFICE
CERTIFICATE OF CORRECTION

PATENT NO. : 7,133,476 B2  Page 1 of 1
APPLICATION NO. : 10/210606
DATED : November 7, 2006
INVENTOR(S) : Arslan et al.

It is certified that error appears in the above-identified patent and that said Letters Patent is hereby corrected as shown below:

See attached sheet

In Column 4, Line 57, in Equation 8, delete " $\sum_{k=0}^{L-1} \left| \frac{u_I(k)}{u_Q(k)} \right|$ " and insert -- $\sum_{k=0}^{L-1} \left| \frac{u_I(n)}{u_Q(n)} \right|$ --, therefor.

In Column 10, Line 38, in Equation 33, delete " $\hat{v}$ " and insert -- $\hat{v}(n)$ --, therefor.

In Column 15, Line 60, in Claim 25, delete "wit" and insert -- with --, therefor.

In Column 18, Line 24, in Claim 44, delete "modulatiom" and insert -- modulation --, therefor.

Signed and Sealed this

Fifth Day of August, 2008

JON W. DUDAS
*Director of the United States Patent and Trademark Office*